(12) United States Patent
Yamamoto

(10) Patent No.: US 11,969,808 B2
(45) Date of Patent: Apr. 30, 2024

(54) CUTTING TOOL AND METHOD FOR MANUFACTURING MACHINED PRODUCT

(71) Applicant: KYOCERA Corporation, Kyoto (JP)

(72) Inventor: Masahiro Yamamoto, Ritto (JP)

(73) Assignee: KYOCERA Corporation, Kyoto (JP)

( * ) Notice: Subject to any disclaimer, the term of this patent is extended or adjusted under 35 U.S.C. 154(b) by 366 days.

(21) Appl. No.: 17/264,401

(22) PCT Filed: Jul. 31, 2019

(86) PCT No.: PCT/JP2019/029932
§ 371 (c)(1),
(2) Date: Feb. 22, 2021

(87) PCT Pub. No.: WO2020/027171
PCT Pub. Date: Feb. 6, 2020

(65) Prior Publication Data
US 2021/0299766 A1 Sep. 30, 2021

(30) Foreign Application Priority Data

Aug. 1, 2018 (JP) ................................ 2018-145269

(51) Int. Cl.
*B23C 5/22* (2006.01)
(52) U.S. Cl.
CPC ...... *B23C 5/2213* (2013.01); *B23C 2200/367* (2013.01); *B23C 2210/166* (2013.01); *B23C 2210/168* (2013.01); *B23C 2240/24* (2013.01)
(58) Field of Classification Search
CPC ......... B23C 5/24; B23C 5/207; B23C 5/2475; B23C 2200/0494; B23C 2200/085; B23C 2200/12; B23C 2200/203; B23C 2200/367; B23C 2210/166; Y10T 407/1924; Y10T 407/23
See application file for complete search history.

(56) References Cited

U.S. PATENT DOCUMENTS

| | | | | |
|---|---|---|---|---|
| 3,740,807 | A | * 6/1973 | Getts | ................... B23B 27/1662 407/120 |
| 5,667,343 | A | 9/1997 | Hessman et al. | |
| 5,672,031 | A | 9/1997 | Oles | |
| 5,836,724 | A | * 11/1998 | Satran | ................. B23B 27/1662 407/103 |
| 5,871,309 | A | * 2/1999 | Svensson | .............. B23C 5/2208 407/53 |

(Continued)

FOREIGN PATENT DOCUMENTS

| | | |
|---|---|---|
| EP | 2705918 A2 | 3/2014 |
| JP | 08-309612 A | 11/1996 |

(Continued)

*Primary Examiner* — Nicole N Ramos
(74) *Attorney, Agent, or Firm* — Volpe Koenig

(57) ABSTRACT

A cutting tool of the present disclosure may include a holder including a pocket, a shim member, a first screw and an insert. The shim member may include a first hole that opens into an outer side surface and an inner side surface. The pocket may include a second hole corresponding to the first hole. The first screw may be inserted into the first hole and the second hole. A first central axis of the first hole may be located ahead of a second central axis of the second hole in a rotation direction.

12 Claims, 21 Drawing Sheets

(56) References Cited

U.S. PATENT DOCUMENTS

| | | | | |
|---|---|---|---|---|
| 6,050,751 | A * | 4/2000 | Hellstrom | B23B 27/1622 407/103 |
| 6,579,042 | B1 * | 6/2003 | Shiraiwa | B23B 27/1614 407/53 |
| 6,709,204 | B2 * | 3/2004 | Hellstrom | B23B 27/1662 407/104 |
| 7,144,205 | B2 * | 12/2006 | Sheffler | B23C 5/2213 407/103 |
| 2002/0102137 | A1 * | 8/2002 | Ripley | B23C 5/2493 407/43 |
| 2005/0047876 | A1 * | 3/2005 | Schaupp | B23C 5/24 407/36 |
| 2006/0275088 | A1 * | 12/2006 | Lehto | B23C 5/2213 407/113 |
| 2009/0148245 | A1 | 6/2009 | Choi et al. | |
| 2011/0081209 | A1 * | 4/2011 | Engstrom | B23C 5/2213 407/120 |
| 2011/0129309 | A1 * | 6/2011 | Kovac | B23C 5/2213 407/103 |
| 2015/0117969 | A1 | 4/2015 | Brunetto et al. | |

FOREIGN PATENT DOCUMENTS

| | | |
|---|---|---|
| JP | 2009-516600 A | 4/2009 |
| JP | 2013-512787 A | 4/2013 |
| JP | 6327594 B1 | 5/2018 |

* cited by examiner

CUTTING TOOL AND METHOD FOR MANUFACTURING MACHINED PRODUCT

CROSS-REFERENCE TO RELATED APPLICATION

This application is a national stage entry according to 35 U.S.C. 371 of PCT Application No. PCT/JP2019/029932 filed on Jul. 31, 2019, which claims priority to Japanese Application No. 2018-145269 filed on Aug. 1, 2018, which are entirely incorporated herein by reference.

TECHNICAL FIELD

The present disclosure generally relates to a cutting tool and a method for manufacturing a machined product which are intended for use in a cutting process of a workpiece. Specifically, the present disclosure relates to a cutting tool for use in a milling process.

BACKGROUND

For example, a milling cutter is discussed in Japanese Unexamined Patent Publication No. 2013-512787 (Patent Document 1) and may be used as a cutting tool for use in a cutting process of a workpiece, such as metal. The cutting tool discussed in Patent Document 1 may include a holder (cutter body), an insert and a shim.
Displacement of the insert may be reduced, and a load occurred in a cutting operation may be dispersed in a wide range because the cutting tool includes the shim in Patent Document 1.

In recent years, there has been a growing demand for improved accuracy of cutting processes. Hence, there has been a demand for a further reduction of displacement of the insert in the cutting processes.

SUMMARY

A cutting tool in a non-limiting aspect of the present disclosure may include a holder, a shim member, a first screw and an insert. The holder may have a columnar shape extended from a first end to a second end along a rotation axis. The holder may include a pocket located on a side of the first end. The shim member may be located in the pocket. The first screw may fix the shim member to the pocket. The insert may be in contact with the shim member on a front side in a rotation direction of the rotation axis. The shim member may include an outer side surface, an inner side surface and a first hole. The outer side surface may be located on a side of an outer periphery of the holder. The inner side surface may be located on a side opposite to the outer side surface. The first hole may open into the outer side surface and the inner side surface. The pocket may include a second hole corresponding to the first hole. The first screw may be inserted into the first hole and a second hole. A first central axis of the first hole may be located ahead of a second central axis of the second hole in the rotation direction.

DESCRIPTION OF THE EMBODIMENTS

Figure 1:
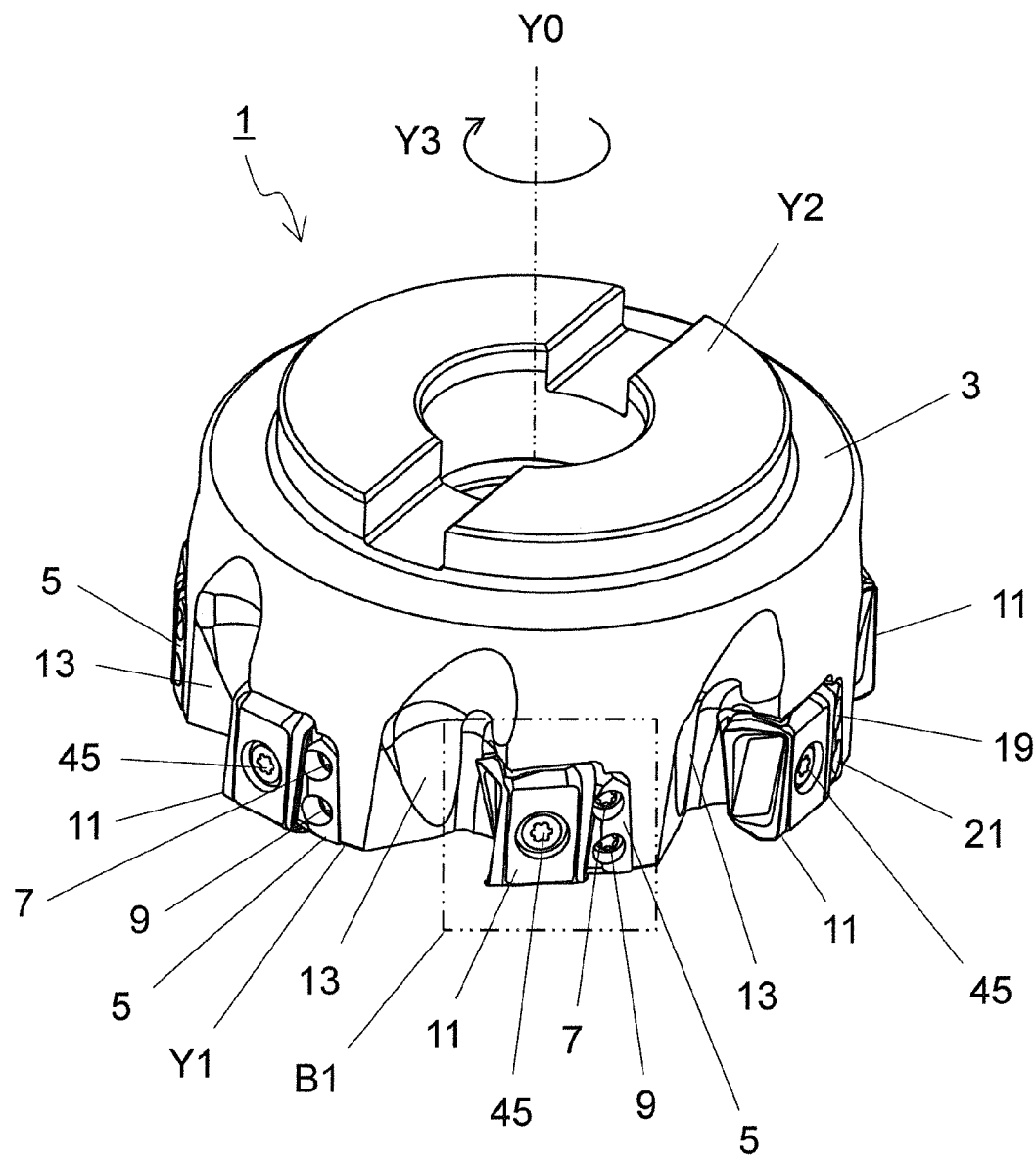
FIG. 1 is a perspective view illustrating a cutting tool in a non-limiting aspect of the present disclosure.
Figure 2:
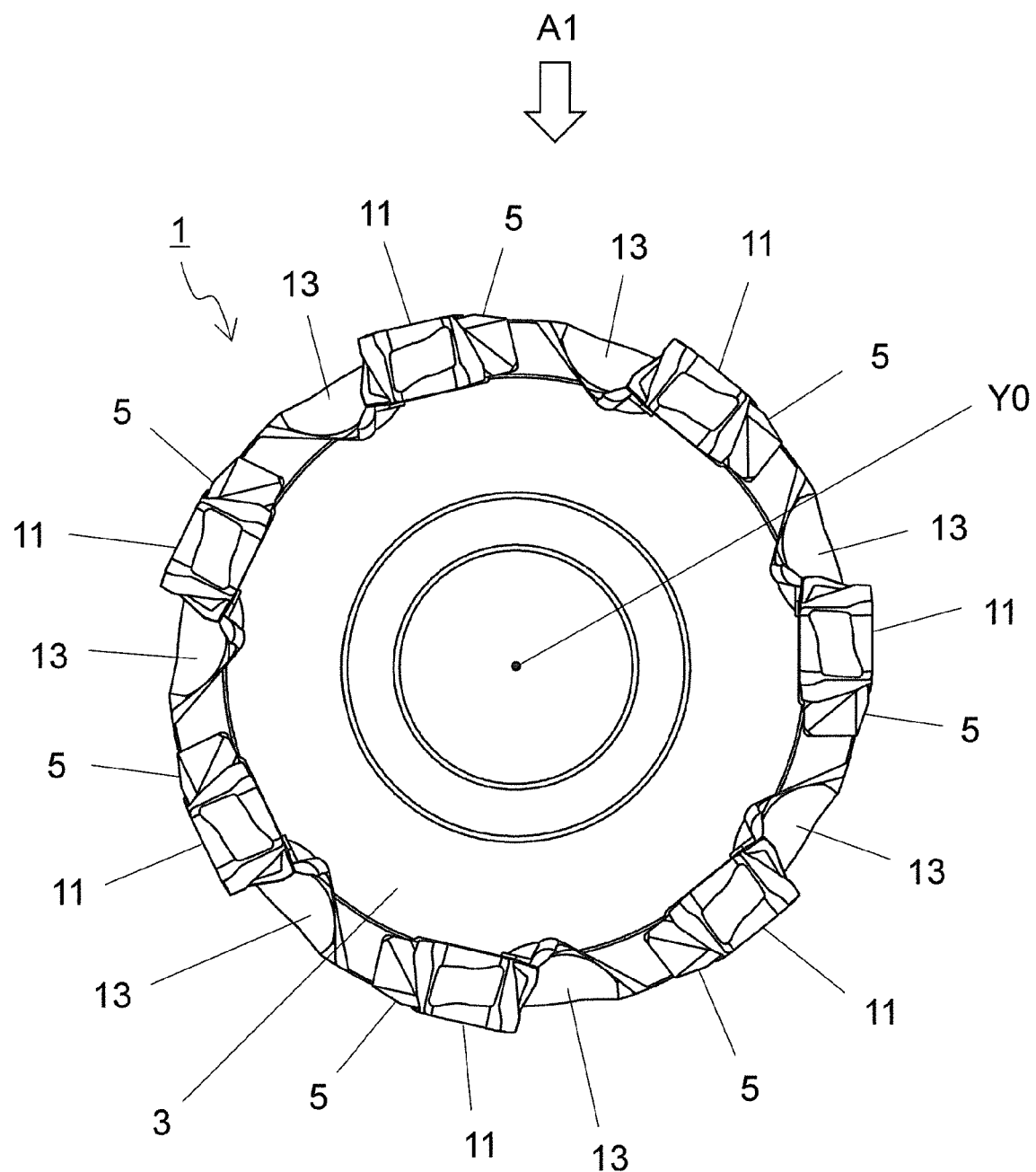
FIG. 2 is a plan view of the cutting tool illustrated in FIG. 1 as viewed from a first end.
Figure 3:
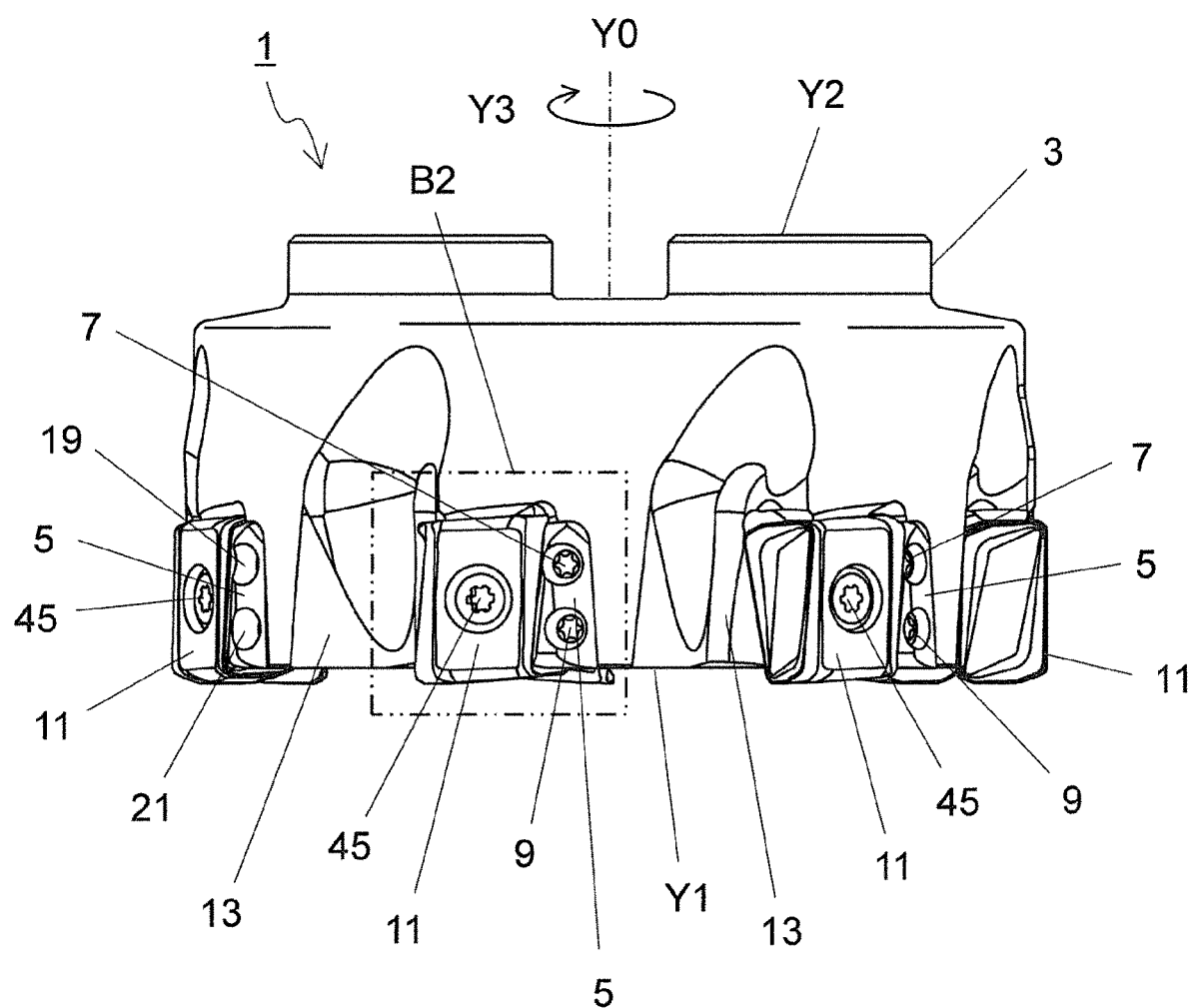
FIG. 3 is a side view of the cutting tool illustrated in FIG. 2 as viewed from an A1 direction.
Figure 4:
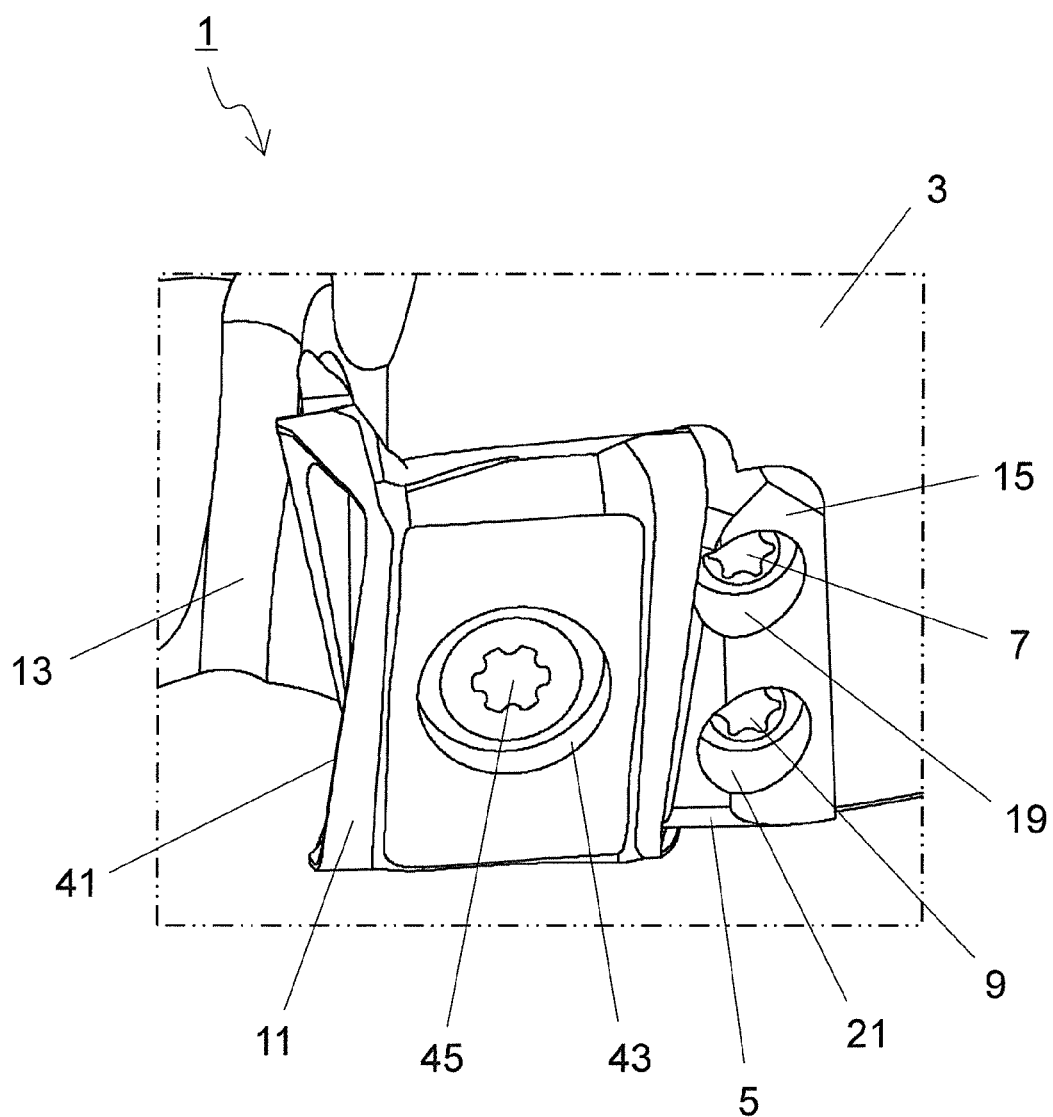
FIG. 4 is an enlarged view of a region B1 illustrated in FIG. 1.
Figure 5:
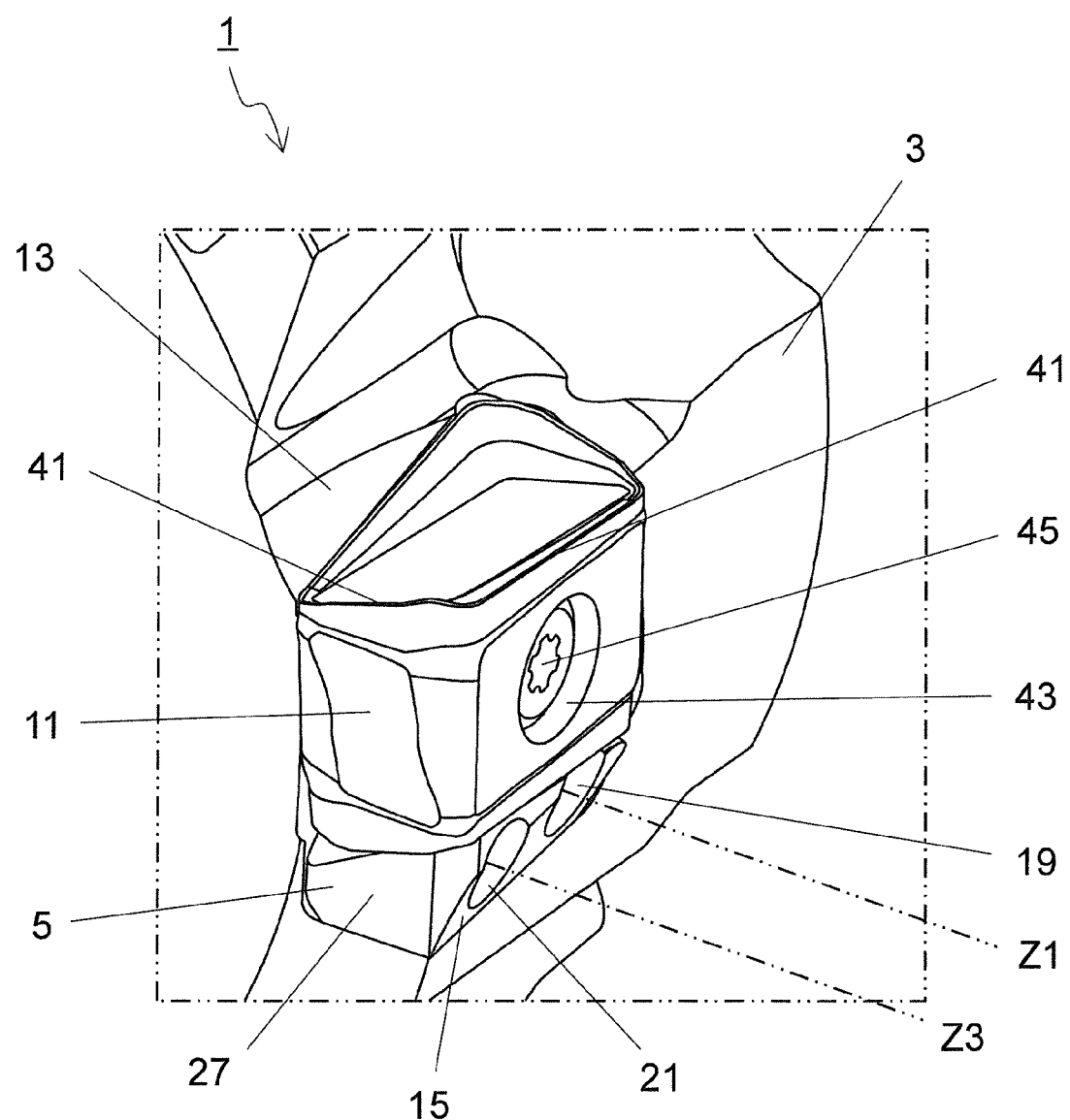
FIG. 5 is an enlarged view of the cutting tool illustrated in FIG. 4 as viewed from a different direction.
Figure 6:
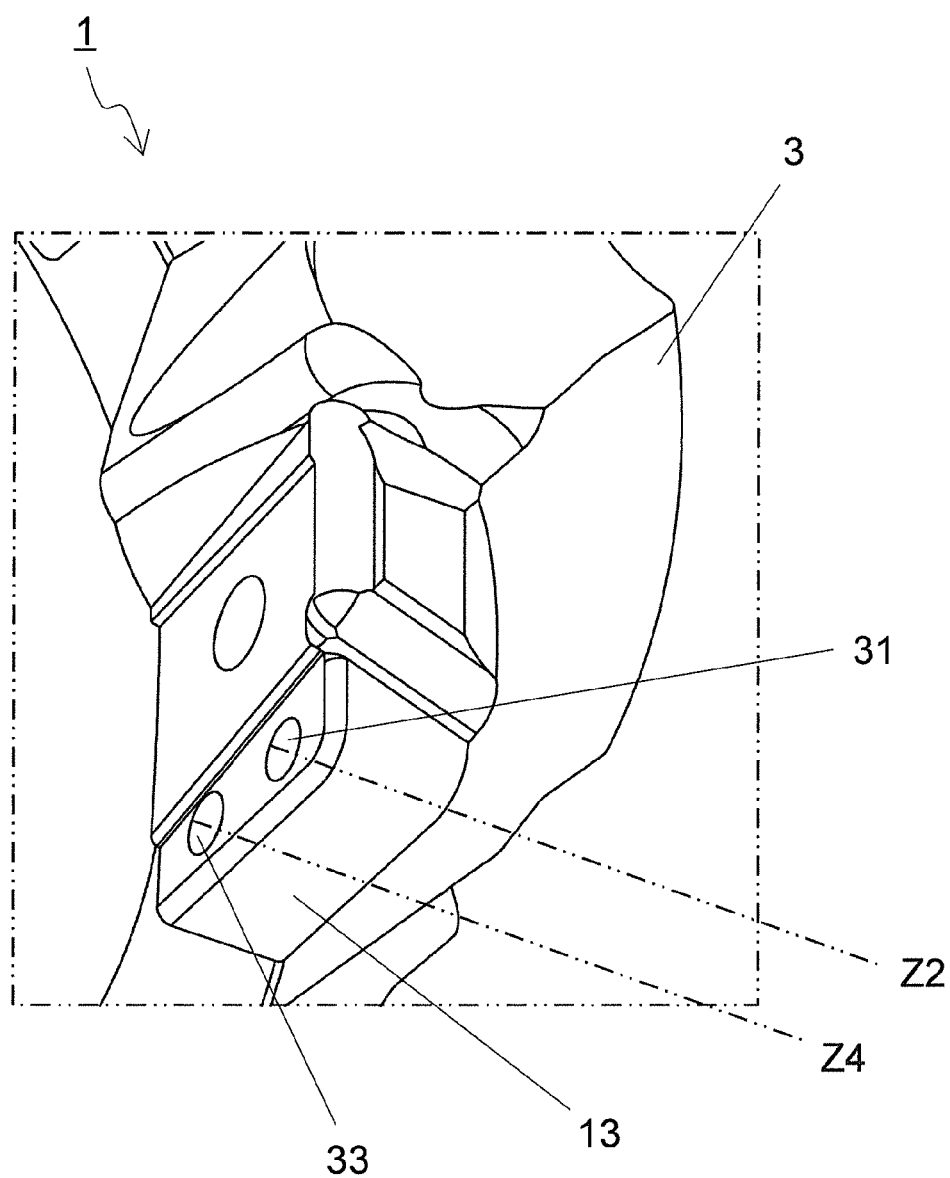
FIG. 6 is an enlarged view of a holder in the cutting tool illustrated in FIG. 5.
Figure 7:
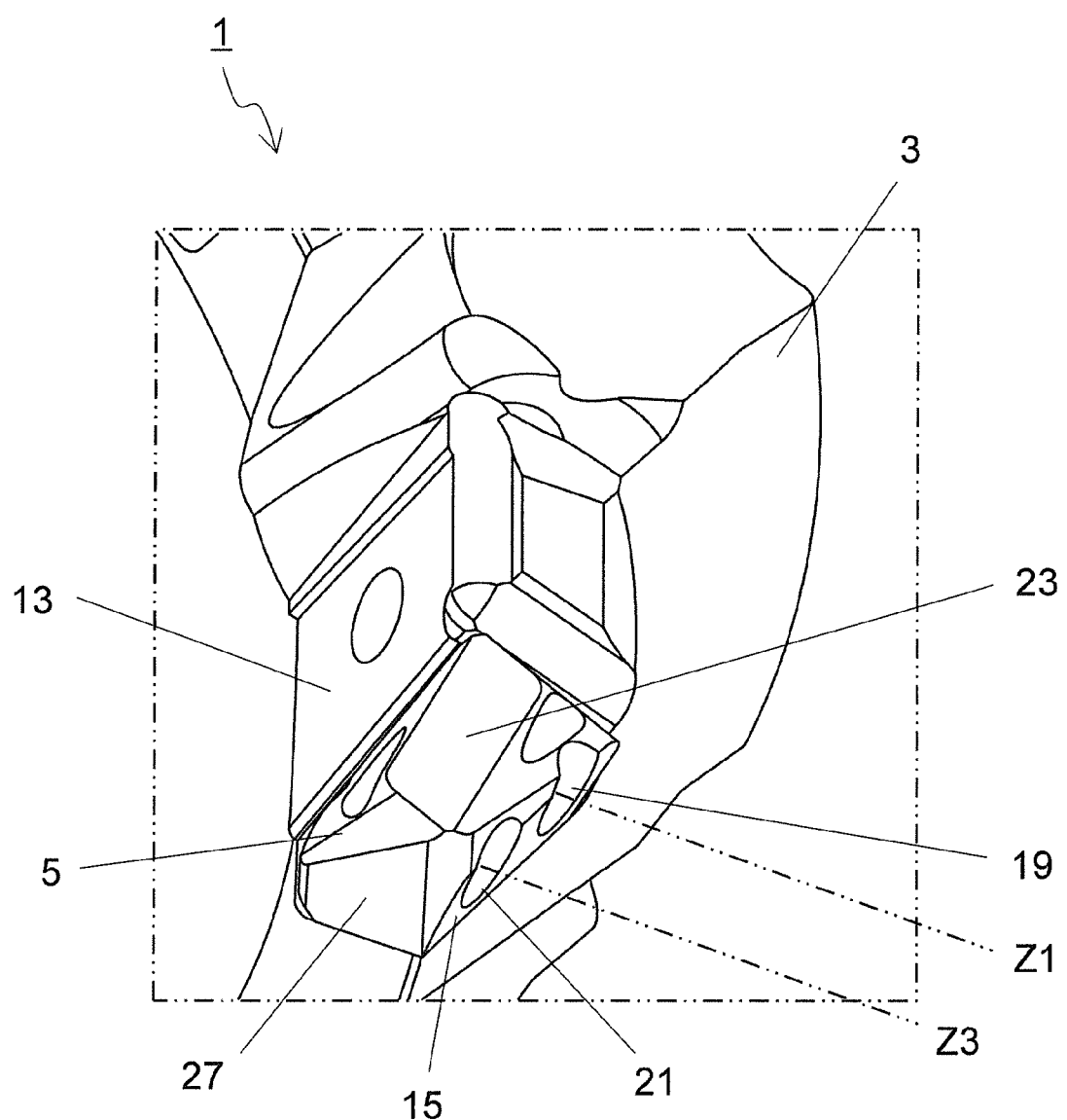
FIG. 7 is an enlarged view of the holder and a shim member in the cutting tool illustrated in FIG. 5.
Figure 8:
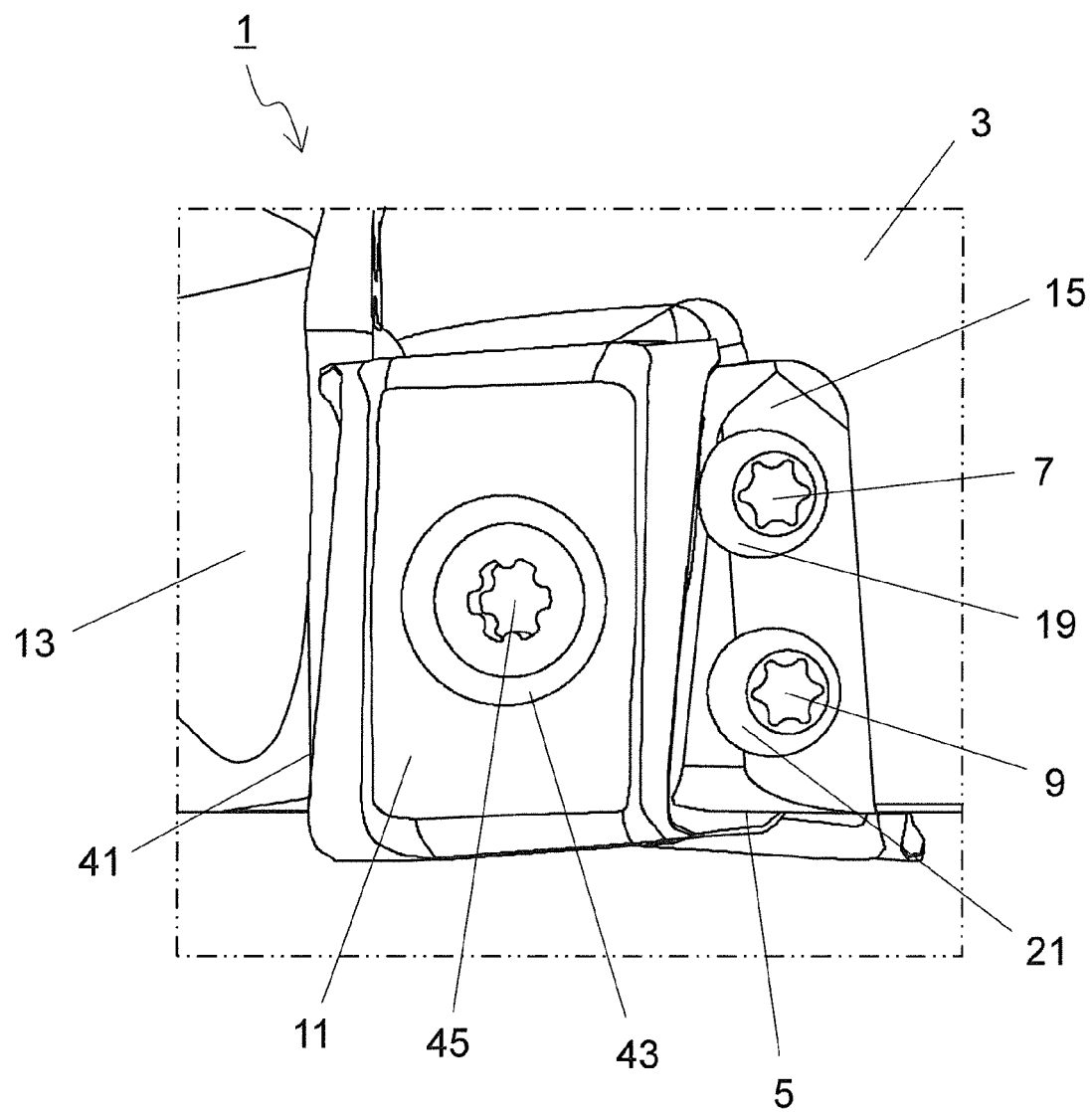
FIG. 8 is an enlarged view of a region B2 illustrated in FIG. 3.
Figure 9:
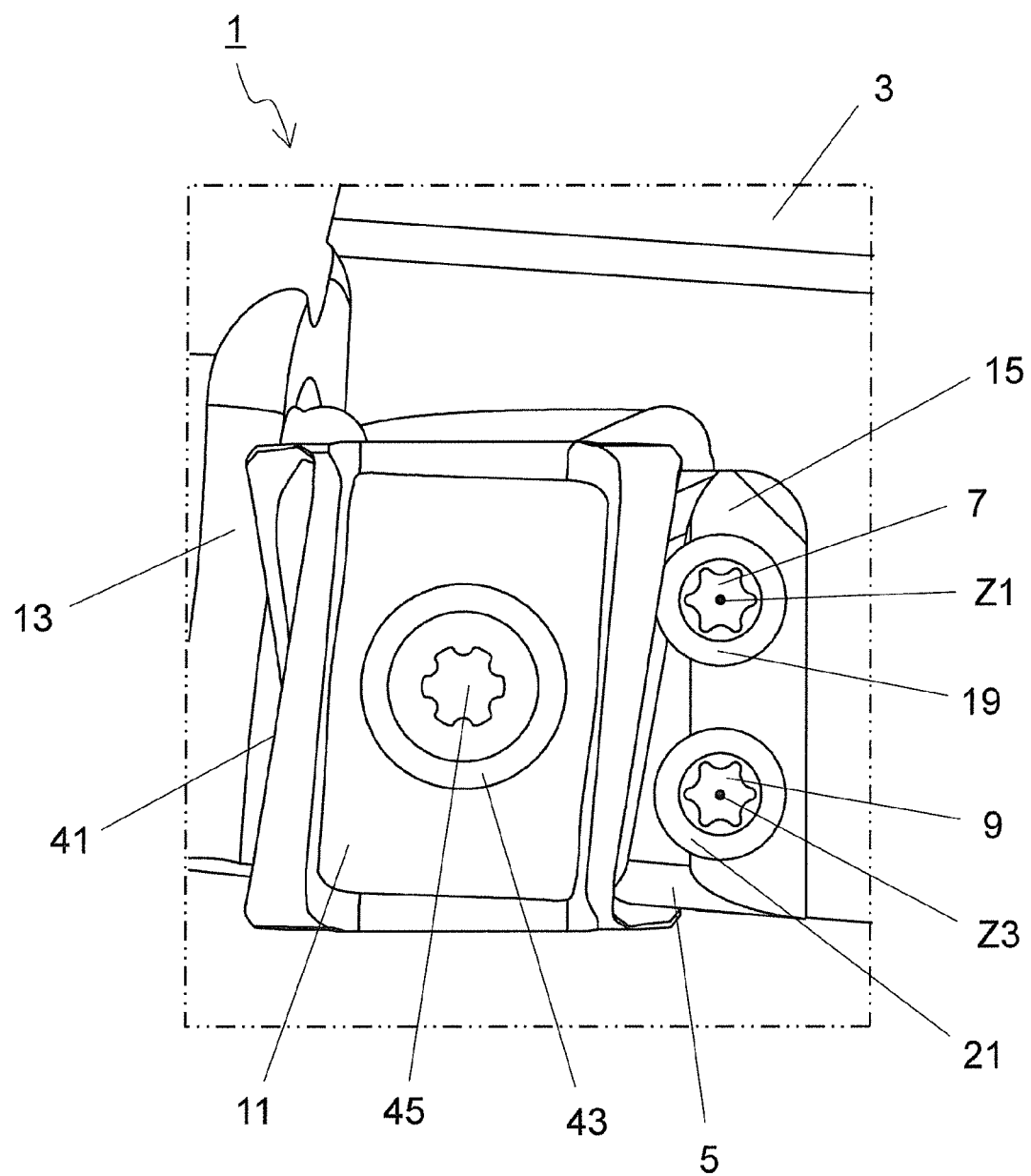
FIG. 9 is an enlarged view of the cutting tool illustrated in FIG. 8 as viewed from a different direction.
Figure 10:
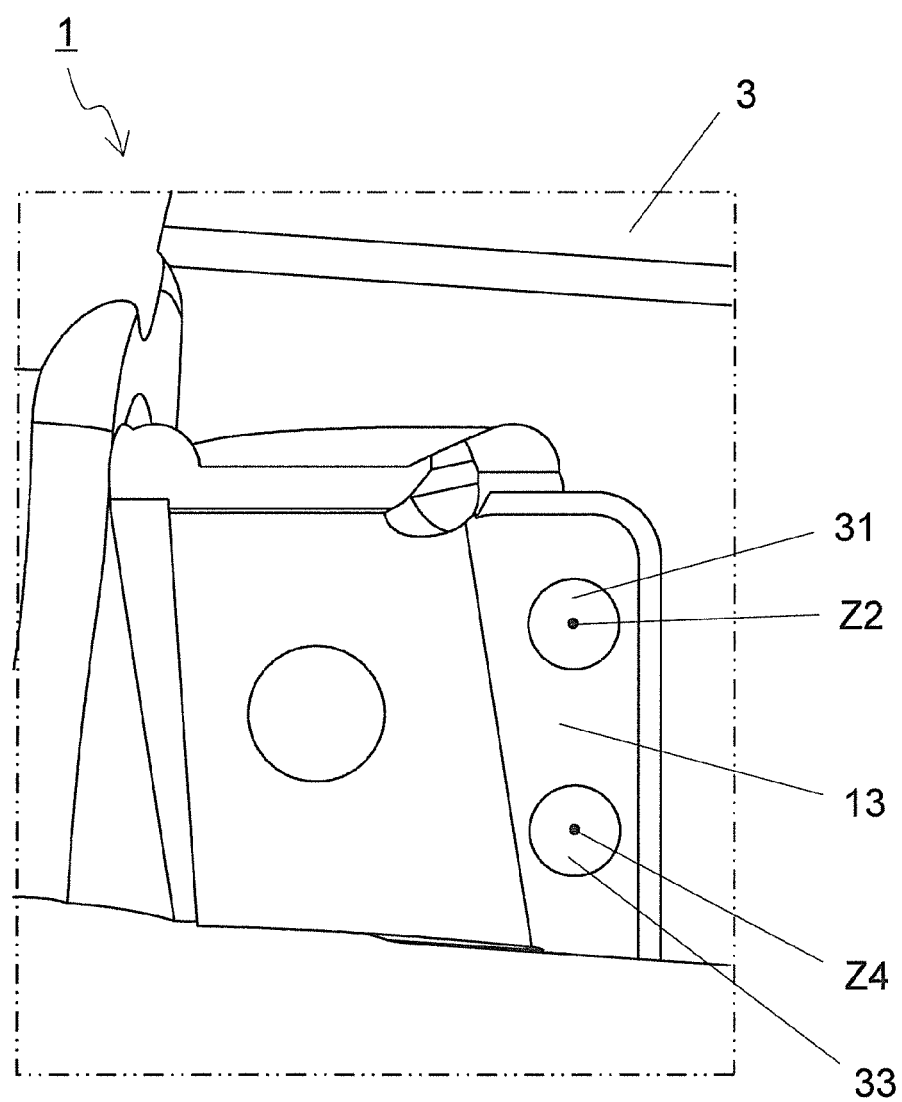
FIG. 10 is an enlarged view of a holder in the cutting tool illustrated in FIG. 8.
Figure 11:
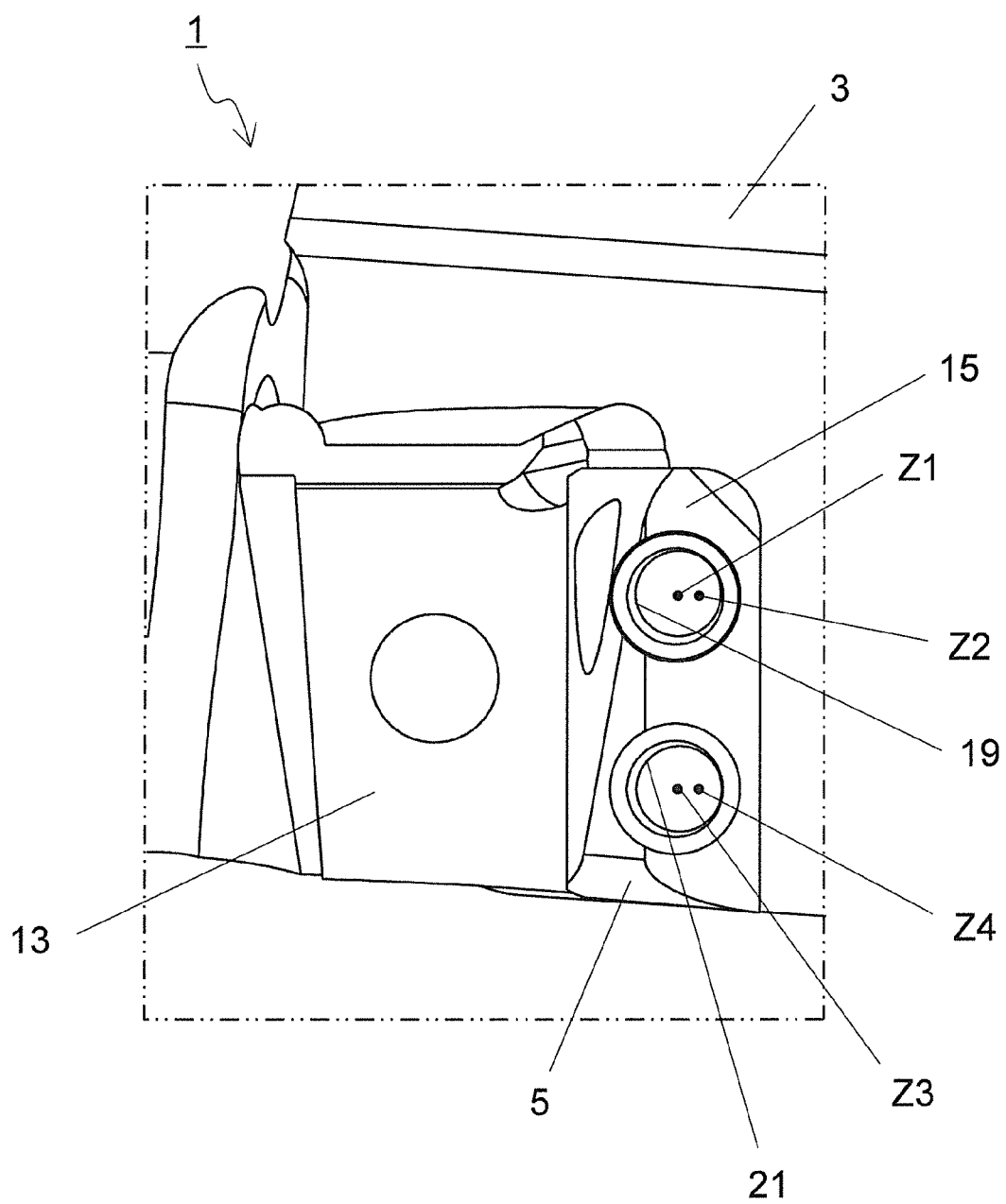
FIG. 11 is an enlarged view of the holder and a shim member in the cutting tool illustrated in FIG. 8.

Cutting tools in non-limiting embodiments may be described in detail below with reference to the drawings. For the sake of description, the drawings referred to in the following may illustrate, in simplified form, only main members necessary for describing the non-limiting embodiments. The cutting tools may therefore be capable of including any arbitrary structural member not illustrated in the drawings referred to in the present specification. Dimensions of the members in each of the drawings may faithfully represent neither dimensions of actual structural members nor dimensional ratios of these members.

<Cutting Tools>

A cutting tool 1 in a non-limiting aspect of the present disclosure may be a rotary tool for use in a milling process. Examples of the cutting tool 1 may include, besides the rotary tool, tools for use in turning processes, such as an outer diameter turning, an inner diameter turning and a grooving process.

The cutting tool 1 may include a holder 3, a shim member 5, a first screw 7, a second screw 9 and an insert 11. The holder 3 may have a columnar shape extended along a rotation axis Y0 from a first end Y1 to a second end Y2. A rotation direction around the rotation axis Y0 may be indicated by Y3 in FIG. 1 or the like. If the cutting tool 1 is the tool for use in the turning processes as described above, the rotation axis Y0 may be rephrased as a central axis.

The cutting tool 1 may include a pocket 13 located on a side of the first end Y1. The cutting tool 1 may include only one pocket 13, or alternatively a plurality of pockets 13 as in a non-limiting embodiment illustrated in FIG. 1. The pockets 13 may open into an outer peripheral surface and an end surface of the first end Y1 in the holder 3 as in the non-limiting embodiment illustrated in FIG. 1. In a front view of the cutting tool 1 as viewed from the first end Y1, these pockets 13 may be located at equal intervals or unequal intervals.

The pocket 13 may be a space to accommodate therein the shim member 5, the first screw 7, the second screw 9 and the insert 11. The pocket 13 may be used as a space that permits passage of chips generated in a cutting process for manufacturing a machined product.

The shim member 5 may be located in the pocket 13 and may be fixed to the pocket 13 by the first screw 7 and the second screw 9. The shim member 5 may be in contact with an end surface of the pocket 13 which is located on a rear side in the rotation direction Y3. In cases where the holder 3 includes the pockets 13 as in the non-limiting embodiment illustrated in FIG. 1, the cutting tool 1 may include a plurality of shim members 5.

The insert 11 may be located in the pocket 13 and may be in contact with the shim member 5. Specifically, the insert 11 may be located ahead of the shim member 5 in the rotation direction Y3, and may be in contact with the shim member 5 on a front side in the rotation direction Y3 of the rotation axis Y. The insert 11 may be susceptible to a cutting load from front to rear in the rotation direction Y3 in the cutting process. In cases where the shim member 5 is in contact with the insert 11 on the rear side in the rotation direction Y3 of the rotation axis Y0, the cutting load applied to the insert 11 may tend to be received by the shim member 5.

Figure 12:
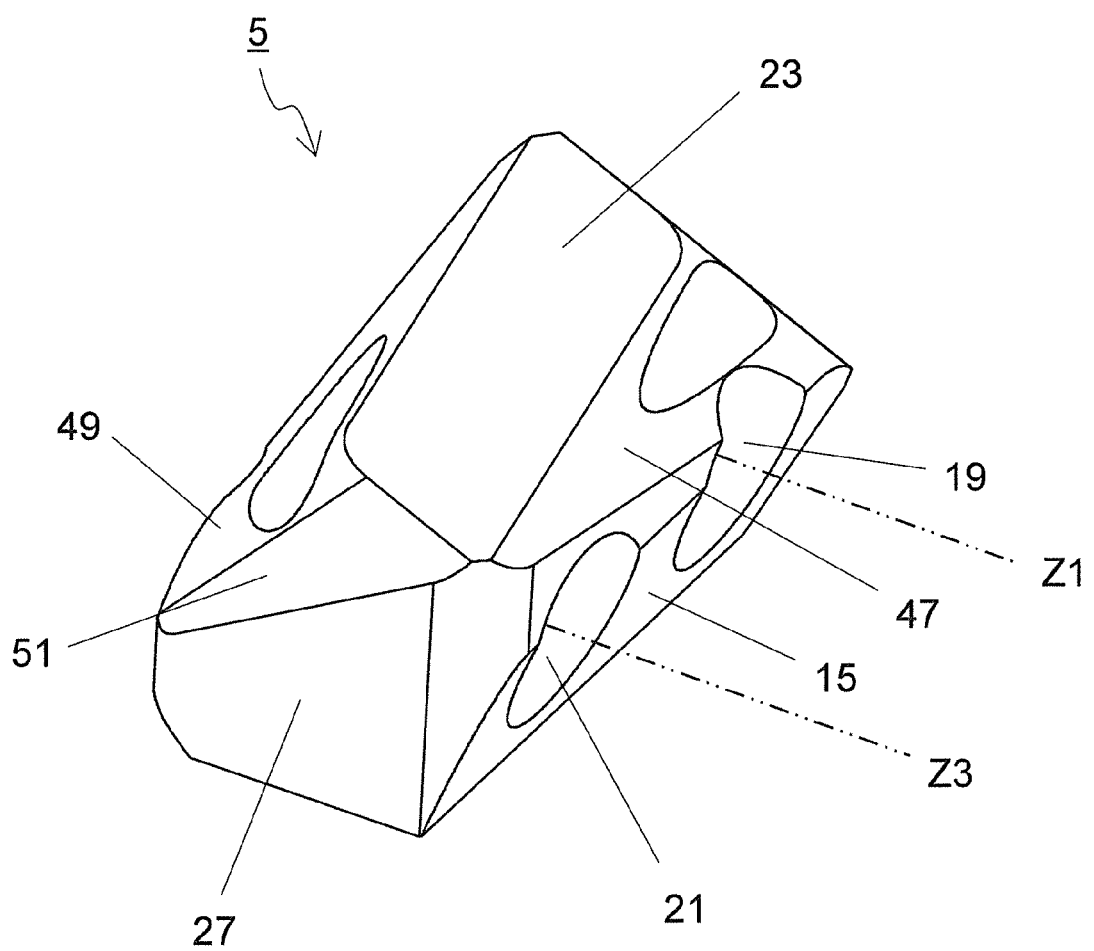
FIG. 12 is a perspective view of a shim member in the cutting tool illustrated in FIG. 1.

The shim member 5 may include an outer side surface 15, an inner side surface 17, a first hole 19 and a third hole 21. The outer side surface 15 may be located on a side of an outer periphery of the holder 3. The inner side surface 17 may be located on a side opposite to the outer side surface 15. The inner side surface 17 may be in contact with a surface of the pocket 13. The shim member 5 in a non-limiting embodiment illustrated in FIG. 12 may have an approximately quadrangular plate shape. The shim member 5 may include a surface other than the outer side surface 15 and the inner side surface 17.

For example, the shim member 5 may include a front side surface 23 located on a front side in the rotation direction Y3, and a rear side surface 25 located on a rear side in the rotation direction Y3. The front side surface 23 may be used as a surface to be in contact with the insert 11. The rear side surface 25 may be used as a surface to be in contact with a surface of the pocket 13.

Alternatively, the shim member 5 may include a first end surface 27 located on a side of the first end Y1, and a second end surface 29 located on a side of a second end Y2. The first end surface 27 and the second end surface 29 may be individually located between the front side surface 23 and the rear side surface 25. The first end surface 27 and the second end surface 29 may be individually located between the outer side surface 15 and the inner side surface 17. The second end surface 29 may be used a surface to be in contact with the surface of the pocket 13.

The first hole 19 may open into the outer side surface 15 and the inner side surface 17. The first hole 19 may be a portion that permits insertion of the first screw 7. Similarly to the first hole 19, the third hole 21 may open into the outer side surface 15 and the inner side surface 17. The third hole 21 may be a portion that permits insertion of the second screw 9. Specifically, the third hole 21 may be located closer to the first end Y1 than the first hole 19.

As illustrated in non-limiting embodiments illustrated in FIGS. 12 to 17, the first hole 19 and the third hole 21 may open into the outer side surface 15 and the inner side surface 17 instead of the front side surface 23 and the rear side surface 25. In cases where neither the first hole 19 nor the third hole 21 opens into the front side surface 23, it may be easy to ensure that the shim member 5 has a wide contact area with the insert 11. In cases where neither the first hole 19 nor the third hole 21 opens into the rear side surface 25, it may be easy to ensure that the shim member 5 has a wide contact area with the surface of the pocket 13.

Hereinafter, a central axis that indicates an extending direction of the first hole 19 may be a first central axis Z1.

A central axis that indicates an extending direction of the third hole 21 may be a third central axis Z3. The first central axis Z1 and the third central axis Z3 may be extended from a side of the outer periphery of the holder 3 toward a center thereof. The first screw 7 being inserted into the first hole 19 may be extended from the side of the outer periphery of the holder 3 toward the center thereof. Similarly, the second screw 9 being inserted into the third hole 21 may be extended from the side of the outer periphery of the holder 3 toward the center thereof. In cases where the holder 3 includes the pockets 13 as in the non-limiting embodiment illustrated in FIG. 1, the cutting tool 1 may include a plurality of first screws 7 and a plurality of second screws 9.

The first central axis Z1 and the third central axis Z3 may be extended toward the center of the holder 3. If the first central axis Z1 and the third central axis Z3 are extended, these central axes Z1 and Z3 may not intersect with the rotation axis Y0. The first central axis Z1 and the third central axis Z3 may be parallel to each other. The first central axis Z1 and the third central axis Z3 may be orthogonal to the rotation axis Y0. The first central axis Z1 and the third central axis Z3 may be orthogonal to the rotation direction Y3.

The pocket 13 may include a second hole 31 corresponding to the first hole 19, and a fourth hole 33 corresponding to the third hole 21. Specifically, the second hole 31 may be connected to the first hole 19 in a state where the shim member 5 is attached to the pocket 13. The fourth hole 33 may also be connected to the third hole 21 in the state where the shim member 5 is attached to the pocket 13.

The second hole 31 may be a portion that permits insertion of the first screw 7. The first screw 7 may be inserted into the first hole 19 and the second hole 31. The fourth hole 33 may be a portion that permits insertion of the second screw 9. The second screw 9 may be inserted into the third hole 21 and the fourth hole 33. In cases where the third hole 21 is located closer to the first end Y1 than the first hole 19, the fourth hole 33 may be located closer to the first end Y1 than the second hole 31.

Grooves may be formed on inner surfaces of the second hole 31 and the fourth hole 33. The shim member 5 may be fixed to the pocket 13 by causing the first screw 7 to be fixed to the groove formed on the second hole 31, and by causing the second screw 9 to be fixed to the screw groove formed on the fourth hole 33. In cases where the shim member 5 is fixed to the pocket 13 as described above, the grooves may not be formed on inner surfaces of the first hole 19 and the third hole 21.

A central axis that indicates an extending direction of the second hole 31 may be a second central axis Z2. A central axis that indicates an extending direction of the fourth hole 33 may be a fourth central axis Z4. The second central axis Z2 and the second central axis Z2 may be extended from a side of the outer periphery of the holder 3 toward the center thereof. The first central axis Z1 of the first hole 19 may be located ahead of the second central axis Z2 of the second hole 31 in the rotation direction Y3. The third central axis Z3 of the third hole 21 may be located ahead of the fourth central axis Z4 of the fourth hole 33 in the rotation direction Y3.

In cases where the first hole 19 and the second hole 31 have the above configuration, the shim member 5 may tend to be pressed against the pocket 13 toward a rear side in the rotation direction Y3 if the shim member 5 is screwed into the pocket 13 by the first screw 7. Consequently, the shim member 5 may be less susceptible to displacement in the rotation direction Y3. The shim member 5 may tend to be in contact with the pocket 13 on the rear side in the rotation direction Y3. Therefore, a cutting load propagated from the insert 11 to the shim member 5 may tend to be received in the pocket 13.

The cutting tool 1 may include a first screw 7 and a second screw 9 as a screw for fixing the shim member 5 to the pocket 13. In other words, a plurality of screws instead of one may be used to screw the shim member 5 into the pocket 13. This may cause less displacement resulting from rotation of the shim member 5 around a shaft of the screw. Consequently, the displacement of the insert 11 may tend to be reduced in the cutting processes.

The second central axis Z2 and the fourth central axis Z4 may be extended toward the center of the holder 3. If the second central axis Z2 and the fourth central axis Z4 are extended, their central axes may not intersect with the central axis Y0. The second central axis Z2 and the fourth central axis Z4 may be parallel to each other. The second central axis Z2 and the fourth central axis Z4 may be orthogonal to the rotation axis Y0. The second central axis Z2 and the fourth central axis Z4 may be orthogonal to the rotation direction Y3.

Dimensions of the shim member 5 are not particularly limited. For example, a maximum width of the front side surface 23 may be set to approximately 3-20 mm. A height from the front side surface 23 to the rear side surface 25 may be set to approximately 3-15 mm.

For example, steel and cast iron may be usable for the holder 103 and the shim member 5. Of these materials, steel may be used from the viewpoint of enhancing toughness of the holder 3 and the shim member 5.

Figure 18:
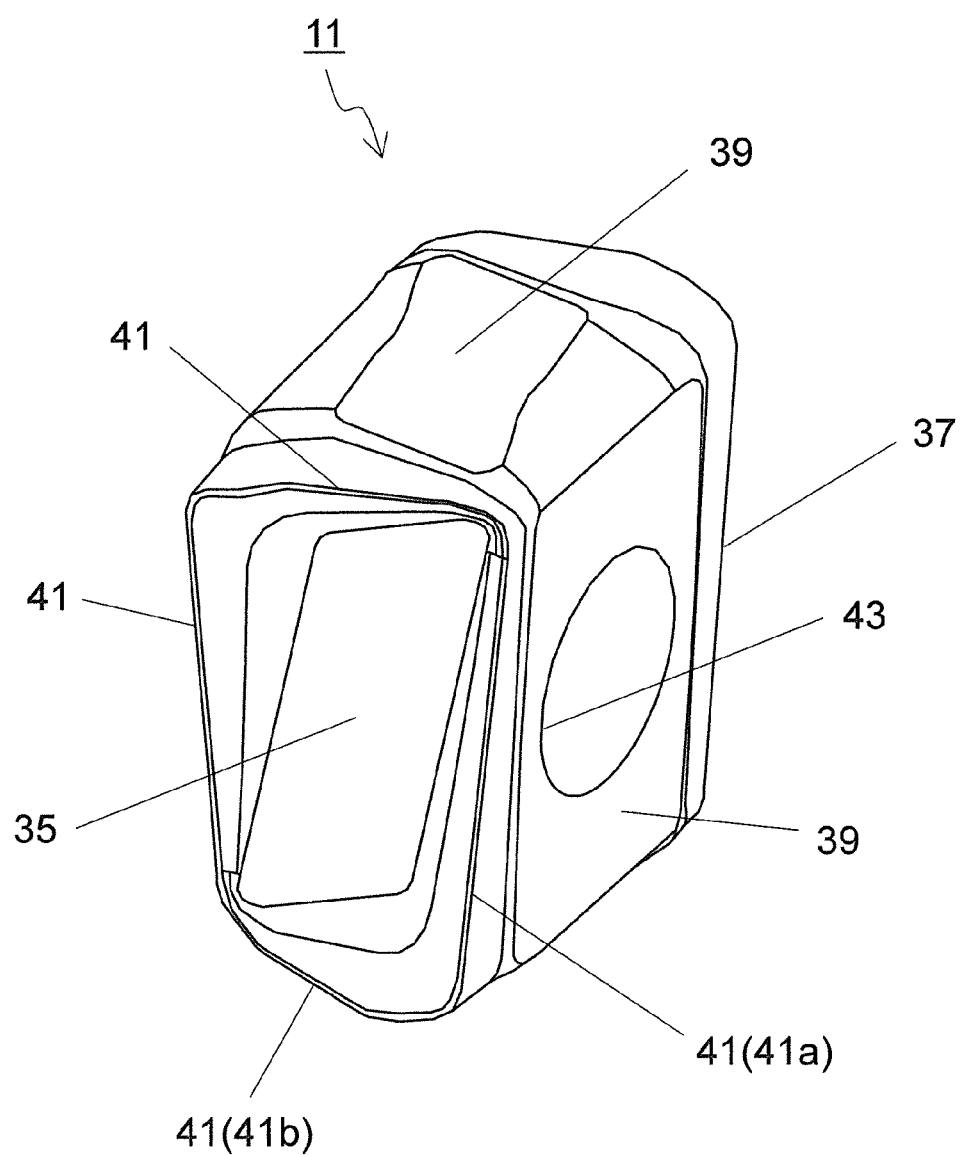
FIG. 18 is a perspective view of an insert in the cutting tool illustrated in FIG. 1.

An insert 11 may have a polygonal plate shape and may include a first surface 35, a second surface 37, a third surface 39 and a cutting edge 41 as in a non-limiting embodiment illustrated in FIG. 18. The first surface 35 may have a polygonal shape and may be located relatively on a front side in the rotation direction Y3 in the insert 11 as is the non-limiting embodiment illustrated in FIG. 1. The second surface 37 may be located on a side opposite to the first surface 35, and may be located relatively on a rear side in the rotation direction Y3 in the insert 11 as in the non-limiting embodiment illustrated in FIG. 1.

The third surface 39 may be located between the first surface 35 and the second surface 37. The third surface 39 may connect to each of the first surface 35 and the second surface 37. The cutting edge 41 may be located on an intersection of the first surface 35 and the third surface 39.

The insert 11 may have a quadrangular plate shape, and the first surface 35 and the second surface 37 may have a quadrangular shape in the non-limiting embodiment illustrated in FIG. 18. The third surface 39 may include four quadrangular parts. The cutting edge 41 may include a first cutting edge 41a and a second cutting edge 41b. The first cutting edge 41a may be located on a ridgeline where one of the four quadrangular parts which is located on a side of the outer periphery of the holder 3 intersects with the first surface 35. The first cutting edge 41a may generally be called an outer peripheral cutting edge or a main cutting edge. The second cutting edge 41b may be located on a ridgeline where one of the four quadrangular parts which is located on a side of the first end Y1 intersects with the first surface 35. The second cutting edge 41b may generally be called a flat cutting edge or a wiper cutting edge.

A shape of the insert 11 is not limited to the above. There may be no problem even if the first surface 35 has, for example, a triangular shape, pentagonal shape or hexagonal shape instead of the quadrangular shape.

The first surface 35 may have a shape that is 180° rotational symmetry around a center of the first surface 35 as in the non-limiting embodiment illustrated in FIG. 18. The center of the first surface 35 can be determined by, for example, an intersection of diagonals of the first surface 35.

The insert 11 may include a through hole 43 that permits attachment of the insert 11 to the holder 3. The through hole 43 may open into portions of the third surface 39 which are located on opposite sides as in the non-limiting embodiment illustrated in FIG. 18. The insert 11 may be fixed to the pocket 13 by causing the third screw 45 to be inserted into the through hole 43, and by causing the third screw 45 to be fixed to the pocket 13.

Dimensions of the insert 11 are not particularly limited. For example, a maximum width of the first surface 35 may be set to approximately 3-20 mm. A height from the first surface 35 to the third surface 39 may be set to approximately 5-20 mm.

For example, cemented carbide or cermet may be usable as a material of the insert 11. Examples of composition of the cemented carbide may include WC—Co, WC—TiC—Co and WC—TiC—TaC—Co, in which WC, TiC and TaC may be hard particles, and Co may be a binding phase.

The cermet may be a sintered composite material obtainable by compositing metal into a ceramic component. Examples of the cermet may include titanium compounds composed mainly of titanium carbide (TiC) or titanium nitride (TiN). The material of the insert 11 is not limited to the above composition.

A surface of the insert 11 may be coated with a coating film by using chemical vapor deposition (CVD) method or physical vapor deposition (PVD) method. Examples of composition of the coating film may include titanium carbide (TiC), titanium nitride (TiN), titanium carbonitride (TiCN) and alumina ($Al_2O_3$).

The first central axis Z1 may be located ahead of the second central axis Z2 in the rotation direction Y3. Specifically, the first central axis Z1 may be located on a side closer to the first end Y1 than the second central axis Z2. The shim member 5 may tend to be pressed against the pocket 13 toward the second end Y2 if the shim member 5 is screwed into the pocket 13 by the first screw 7. The shim member 5 may therefore be less susceptible to displacement in a direction along the rotation axis Y0.

The third central axis Z3 may be located ahead of the fourth central axis Z4 in the rotation direction Y3. Specifically, the third central axis Z3 may be located on a side closer to the first end Y1 than the fourth central axis Z4. The shim member 5 may tend to be pressed against the pocket 13 toward the second end Y2 if the shim member 5 is screwed into the pocket 13 by the second screw 9. The shim member 5 may therefore be less susceptible to displacement in the direction along the rotation axis Y0. Consequently, the insert 11 to be in contact with the shim member 5 may become less susceptible to displacement.

Figure 15:
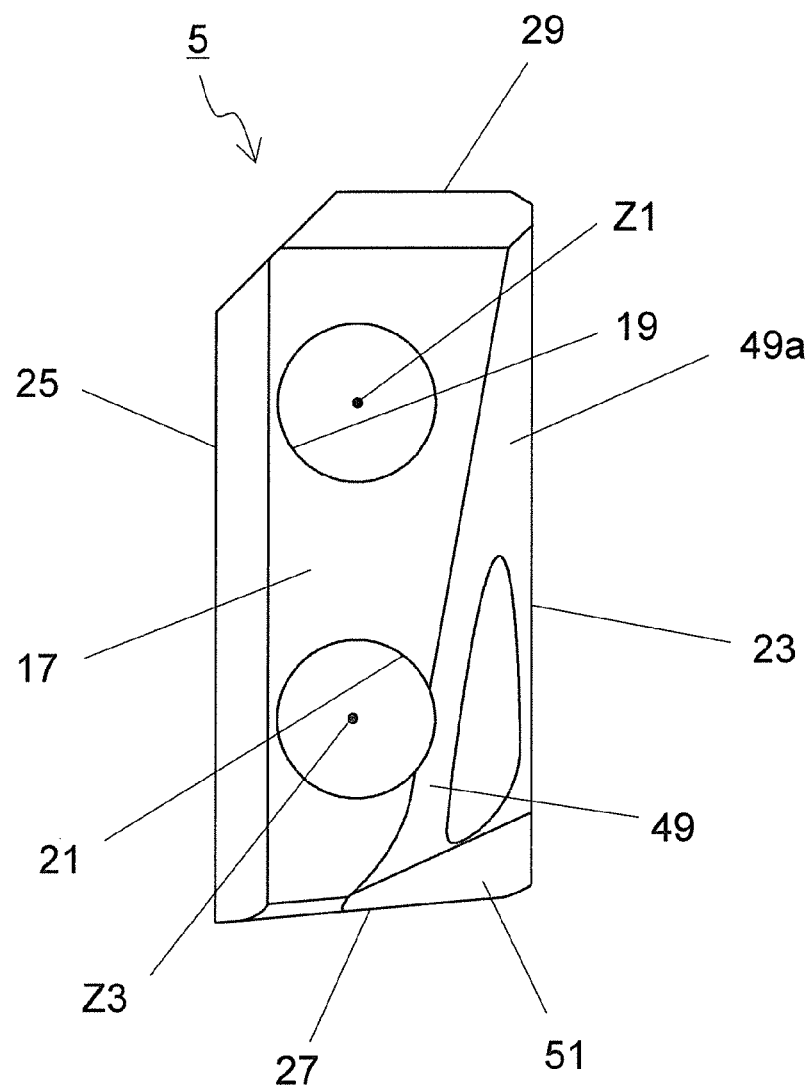
FIG. 15 is a side view of the shim member illustrated in FIG. 11 as viewed from an A3 direction.
Figure 16:
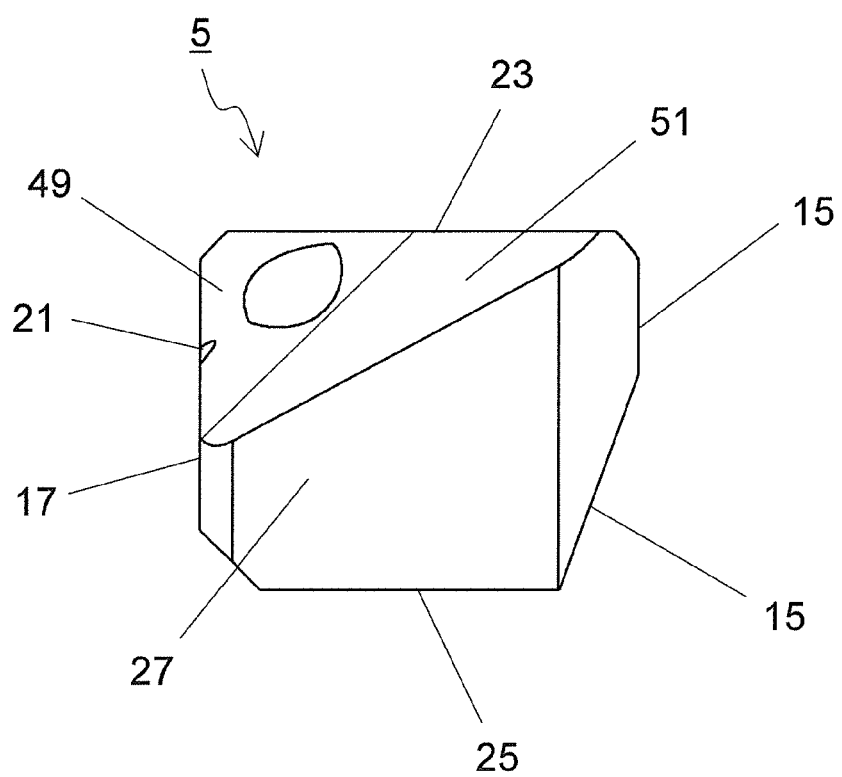
FIG. 16 is a side view of the shim member illustrated in FIG. 11 as viewed from an A4 direction.
Figure 17:
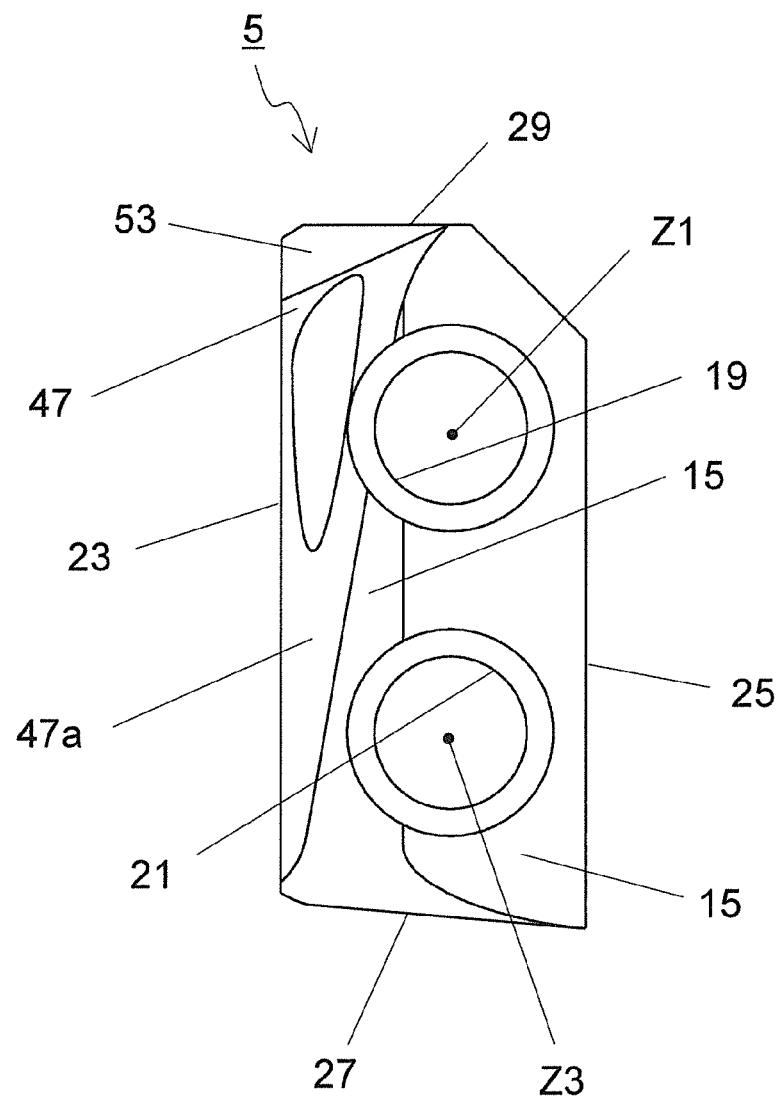
FIG. 17 is a side view of the shim member illustrated in FIG. 11 as viewed from an A5 direction.

The first central axis Z1 may be located closer to the rear side surface 25 than the front side surface 23 as illustrated in FIG. 15 or the like. In other words, the first hole 19 may be located closer to the rear side surface 25 than the front side surface 23 as illustrated in FIG. 15 or the like. In cases where the first hole 19 is located as described above, it may be easy to ensure a thickness of the shim member 5 between the first hole 19 and the front side surface 23. This may lead to enhanced durability of the shim member 5.

The third central axis Z3 may be located closer to the rear side surface 25 than the front side surface 23 as illustrated in FIG. 15 or the like. In other words, the third hole 21 may be located closer to the rear side surface 25 than the front side surface 23 as illustrated in FIG. 15 or the like. In cases where the third hole 21 is located as described above, it may be easy to ensure a thickness of the shim member 5 between the third hole 21 and the front side surface 23. This may lead to the enhanced durability of the shim member 5.

Figure 13:
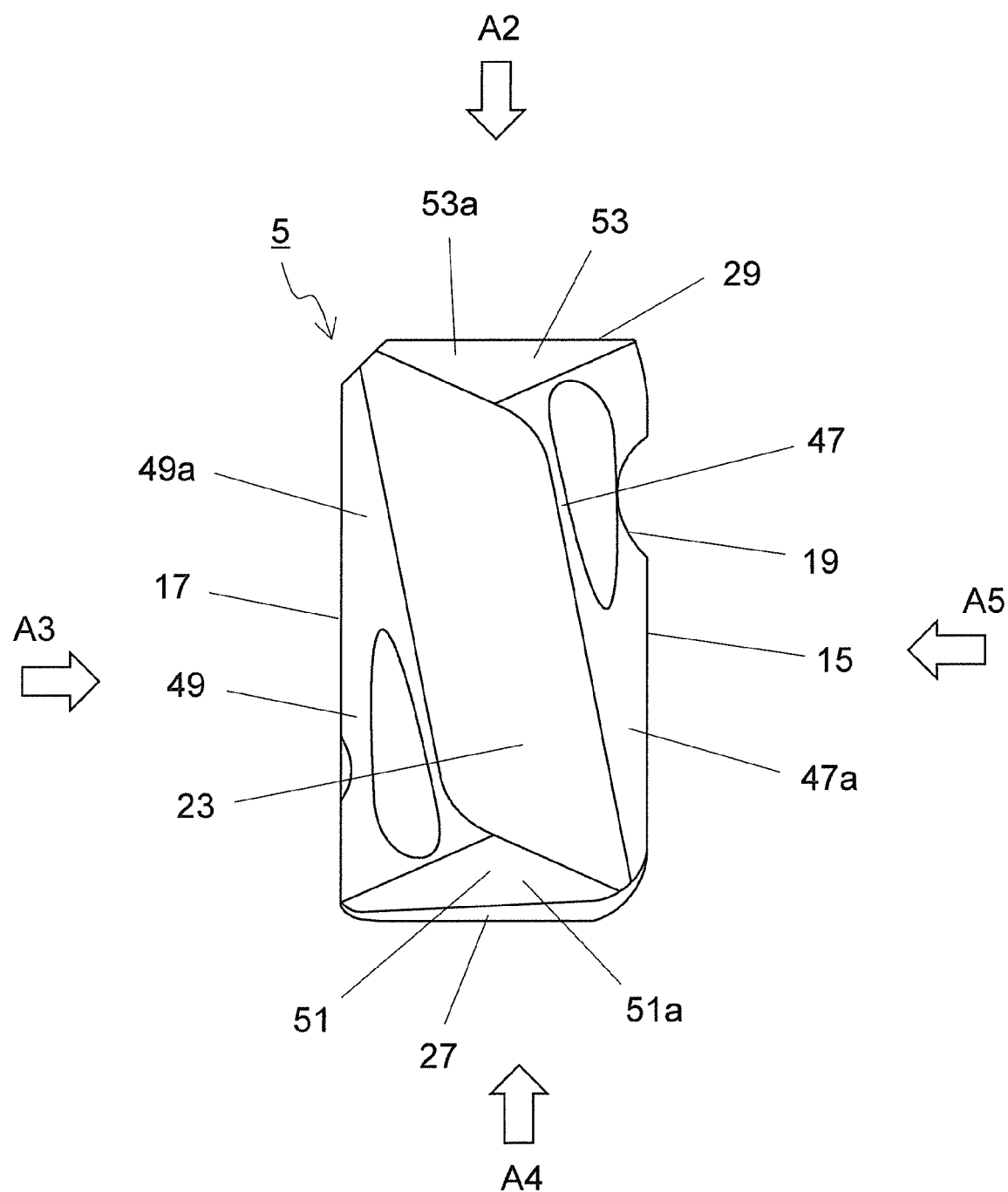
FIG. 13 is a side view of a shim member illustrated in FIG. 10 as viewed from a front side surface.
Figure 14:
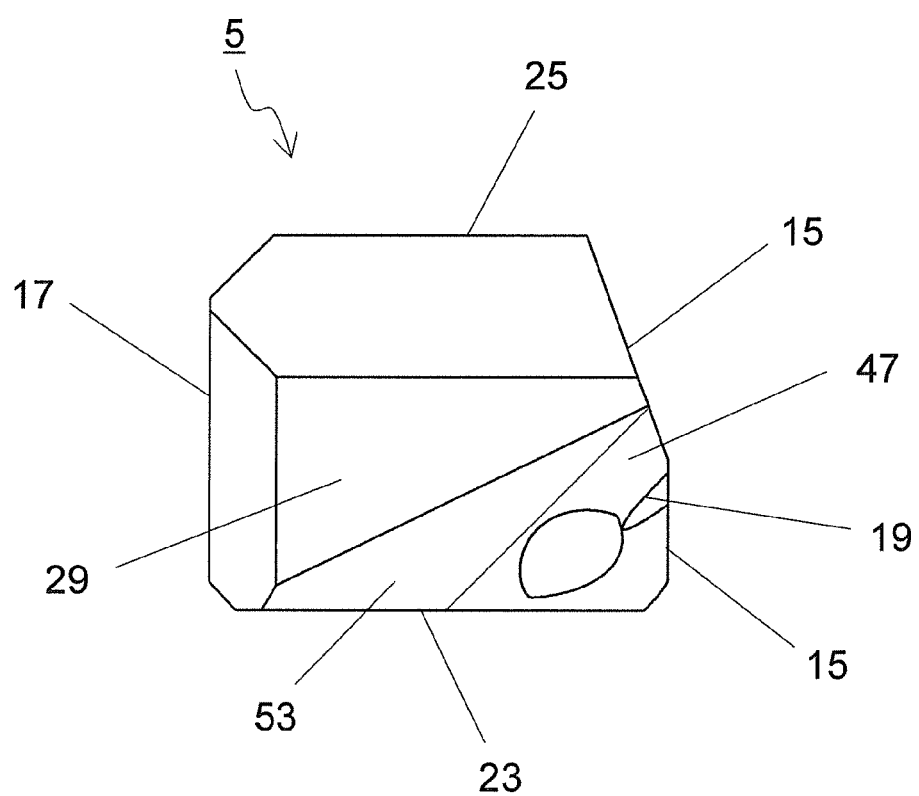
FIG. 14 is a side view of the shim member illustrated in FIG. 11 as viewed from an A2 direction.

The shim member 5 may include a first inclined surface 47 as in the non-limiting embodiment illustrated in FIG. 13. The first inclined surface 47 may be located between the front side surface 23 and the outer side surface 15, and may be inclined so as to be located further away from the rear side surface 25 as going away from the outer side surface 15. High machining accuracy of cutting processes may be achievable if the shim member 5 includes the first inclined surface 47.

During the time when a cutting load is propagated from the insert 11 through the first inclined surface 47 to the shim member 5, a part of force propagated from a front side in the rotation direction Y3 toward a rear side in the rotation direction Y3 may tend to be dispersed in a direction from the outer periphery of the holder 3 toward the center thereof. Simply stated, a part of a cutting load applied in a circumferential direction of the holder 3 can be dispersed in a radial direction of the holder 3. For this reason, chatter vibration can be reduced to achieve the high machining accuracy of the cutting processes.

The first inclined surface 47 may further include a first portion 47a whose width in a direction parallel to the first central axis Z1 becomes larger as going from the second end Y2 to the first end Y1. A cutting load applied to the first cutting edge 41a may tend to be mainly propagated from the insert 11 through the first inclined surface 47 to the shim member 5. Specifically, a larger cutting load may tend to be applied to a part of the first cutting edge 41a which is located closer to the first end Y1.

The first portion 47a may have a larger width in the direction parallel to the first central axis Z1 to which a larger cutting load tends to be applied. Hence, a region of the first portion 47a to which the larger cutting load tends to be applied may be capable of stably receiving and dispersing the cutting load in a wide range. If the first inclined surface 47 includes the first portion 47a, the displacement of the insert 11 may tend to be further reduced.

The shim member 5 may include a second inclined surface 49. As in the non-limiting embodiment illustrated in FIG. 13, the second inclined surface 49 may be located between the front side surface 23 and the inner side surface 17, and may be inclined so as to be located further away from the rear side surface 25 as going away from the inner side surface 17. The insert 11 may be less susceptible to displacement if the shim member 5 includes the second inclined surface 49.

A force may be applied to the insert 11 in a direction away from the rotation axis Y0 because, for example, the cutting tool 1 may be rotated during a cutting process. The insert 11 may be subjected to displacement toward the outer periphery of the holder 3 due to the force thus applied. The insert 11 may be in contact with the second inclined surface 49 if the shim member 5 includes the second inclined surface 49. In other words, the insert 11 may be caught on the second inclined surface 49, so that the insert 11 may be less susceptible to displacement toward the outer periphery of the holder 3.

The second inclined surface 49 may further include a second portion 49a whose width in the direction parallel to the first central axis Z1 becomes larger as going from the first end Y1 to the second end Y2 in a plan view from the front side surface 23.

As described above, the larger cutting load may tend to be applied to the part of the first cutting edge 41a which is located closer to the first end Y1. Therefore, a part of the shim member 4 which is located closer to the first end Y1 may be susceptible to the large cutting load. If the second inclined surface 49 includes the second portion 49a, a wide area of the second inclined surface 40 with which the insert 11 is in contact can be ensured while ensuring a thickness of a part of the shim member 5 to which the large cutting load tends to be applied.

The shim member 5 may include a third inclined surface 51. The third inclined surface 51 may be located between the front side surface 23 and the first end surface 27, and may be inclined so as to be located further away from the rear side surface 25 as going away from the first end surface 27 as in the non-limiting embodiment illustrated in FIG. 13. The high machining accuracy of cutting processes may be achievable if the shim member 5 includes the third inclined surface 51.

During the time when a cutting load is propagated from the insert 11 through the third inclined surface 51 to the shim member 5, a part of force propagated from a front side in the rotation direction Y3 toward a rear side in the rotation direction Y3 may tend to be dispersed in a direction from the first end Y1 to the second end Y2. Simply stated, a part of a cutting load applied in a circumferential direction of the holder 3 can be dispersed in the rotation axis Y0 of the holder 3. For this reason, chatter vibration can be reduced to achieve the high machining accuracy of cutting processes.

The third inclined surface 51 may further include a third portion 51a whose width in a direction orthogonal to the first central axis Z1 becomes larger as going from a side of the inner surface 17 toward a side of the outer side surface 15 in the plan view from the front side surface 23. A cutting load applied to the second cutting edge 41b may tend to be mainly propagated from the insert 11 through the third inclined surface 51 to the shim member 5. Specifically, a larger cutting load may tend to be applied to a part of the second cutting edge 41b which is located closer to the outer periphery.

The third portion 51a may have a larger width in the direction orthogonal to the first central axis Z1 to which a larger cutting load tends to be applied. Hence, a region of the third portion 51a to which the larger cutting load tends to be applied may be capable of stably receiving and dispersing the cutting load in a wide range. If the third inclined surface 51 includes the third portion 51a, the displacement of the insert 11 may tend to be further reduced.

The shim member 5 may include a fourth inclined surface 53. As in the non-limiting embodiment illustrated in FIG. 13, the fourth inclined surface 53 may be located between the front side surface 23 and the second end surface 20, and may be inclined so as to be located further away from the rear side surface 25 as going away from the second end surface 29. The insert 11 may be less susceptible to displacement if the shim member 5 includes the fourth inclined surface 53.

A force may be applied to the insert 11 in a direction away from the second end Y2 because, for example, the second cutting edge 41b bites a workpiece during a cutting process. The insert 11 may be subjected to displacement in a direction away from the second end Y2 due to the force this applied. The insert 11 may be in contact with the fourth inclined surface 53 if the shim member 5 includes the fourth inclined surface 53. In other words, the insert 11 may tend to be caught on the fourth inclined surface 53, so that the insert 11 may be less susceptible to displacement in the direction away from the second end Y2.

The fourth inclined surface 53 may further include a fourth portion 53a whose width in the direction orthogonal to the first central axis Z1 becomes larger as going from a side of the outer side surface 15 toward a side of the inner side surface 17 in the plan view from the front side surface 23.

As described above, the larger cutting load may tend to be applied to the part of the second cutting edge 41b which is located closer to the outer periphery. Therefore, the larger cutting load may tend to be applied to the part of the shim member 5 which is located closer to the outer periphery. If the fourth inclined surface 53 includes the fourth portion 53a, a wide area of the fourth inclined surface 53 with which the insert 11 is in contact can be ensured while ensuring a thickness of a part of the shim member 5 to which the large cutting load tends to be applied.

<Method for Manufacturing Machined Product>

Figure 19:
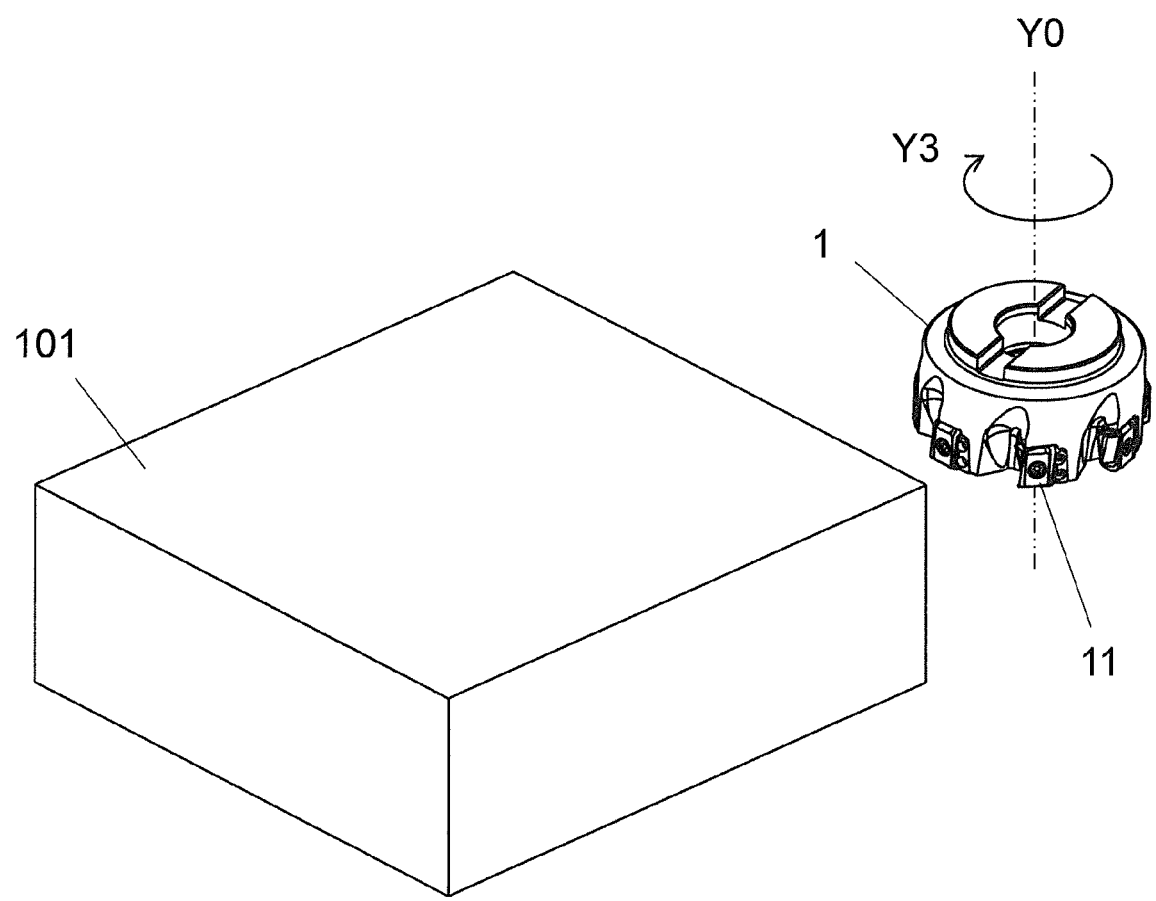
FIG. 19 is a schematic diagram illustrating one of steps in a method for manufacturing a machined product in a non-limiting aspect of the present disclosure.
Figure 20:
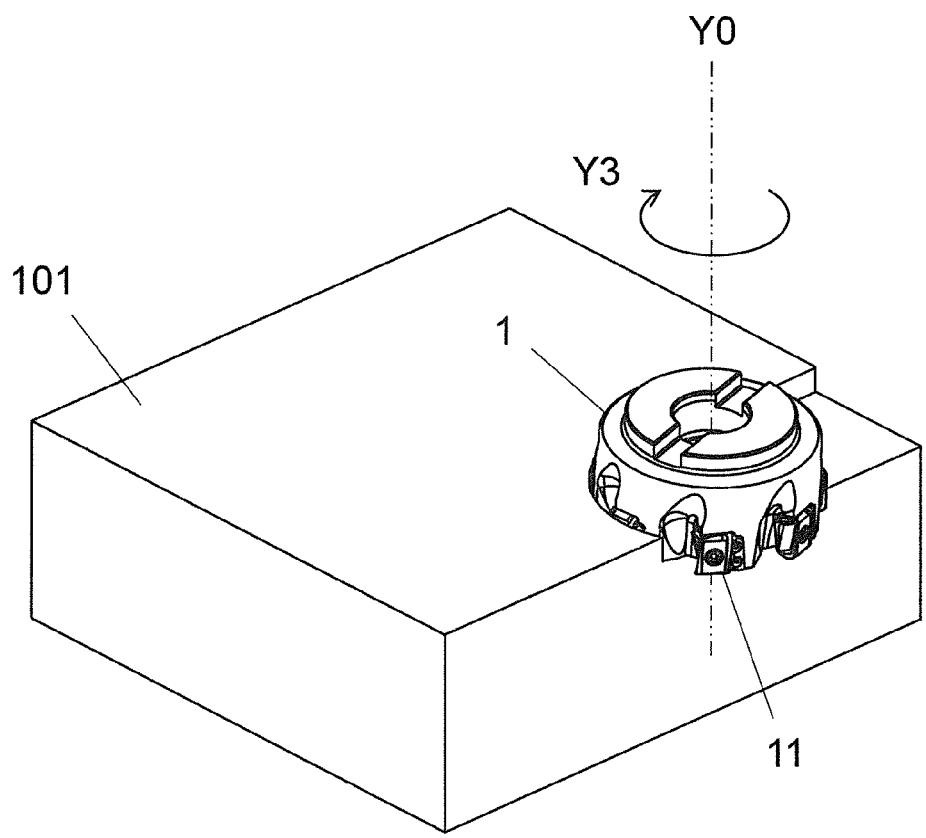
FIG. 20 is a schematic diagram illustrating one of the steps in the method for manufacturing a machined product in the non-limiting aspect of the present disclosure.
Figure 21:
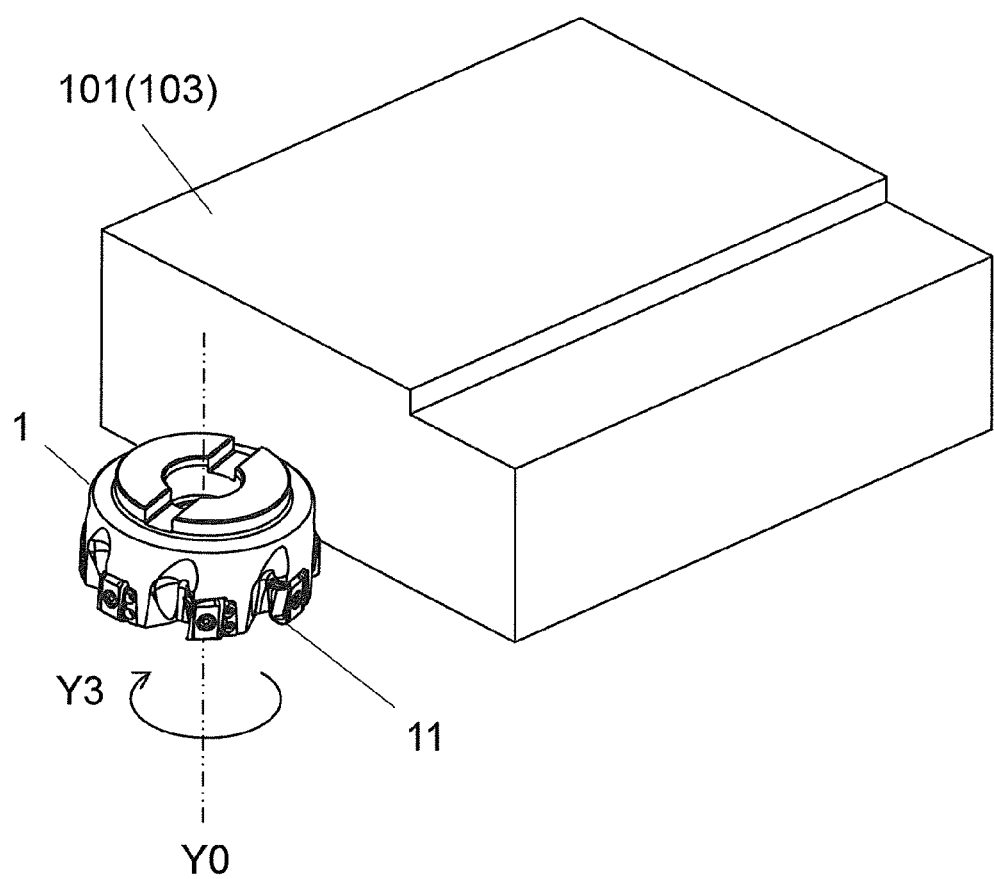
FIG. 21 is a schematic diagram illustrating one of the steps in the method for manufacturing a machined product in the non-limiting aspect of the present disclosure.

A method for manufacturing a machined product in a non-limiting aspect of the present disclosure may be described below with reference to FIGS. 19 to 21. FIGS. 19 to 21 may illustrate a method for manufacturing a machined product in a cutting process using the above cutting tool. The rotation axis Y0 of the cutting tool 1 may be indicated by a two-dot chain line in FIGS. 19 to 21. The machined product 103 may be manufacturable by carrying out the cutting process of the workpiece 101.

The method for manufacturing the machined product may include the following steps:
(1) rotating the cutting tool 1 represented by the foregoing embodiment;
(2) bringing the cutting tool 1 being rotated into contact with the workpiece 101; and
(3) moving the cutting tool 1 away from the workpiece 101.

Specifically, firstly, the cutting tool 1 may be relatively brought near the workpiece 101 while rotating the cutting tool 1 in a direction Y3 around the rotation axis Y0 as illustrated in FIG. 19. The workpiece 101 may be then cut out by bringing the cutting edge in the cutting tool 1 into contact with the workpiece 101 as illustrated in FIG. 20. Thereafter, the cutting tool 1 may be relatively moved away from the workpiece 101 as illustrated in FIG. 21.

The workpiece 101 may be fixed and the cutting tool 1 may be brought near the workpiece 101. Alternatively, the workpiece 101 may be fixed and the cutting tool 1 may be rotated around the rotation axis Y0 as in the non-limiting embodiment illustrated in FIGS. 19 to 21. Still alternatively, the workpiece 101 may be fixed and the cutting tool 1 may be moved away as in the non-limiting embodiment illustrated in FIG. 21. During the cutting process, the workpiece 101 may be fixed and the cutting tool 1 may be moved in each of the steps in the non-limiting embodiment illustrated in FIGS. 19 to 21. However, it is not intended to limit to this embodiment.

For example, the workpiece 101 may be brought near the cutting tool 1 in the step (1). Similarly, the workpiece 101 may be moved away from the cutting tool 1 in the step (3). If desired to continue the cutting process, the step of bringing the cutting edge in the insert into contact with different portions of the workpiece 101 may be repeated while keeping the cutting tool 1 rotated.

Representative examples of material of the workpiece 101 may include carbon steel, alloy steel, stainless steel, cast iron and nonferrous metals.

DESCRIPTION OF THE REFERENCE NUMERAL 1 cutting tool
3 holder
5 shim member
7 first screw
9 second screw
11 insert
13 pocket
15 outer side surface
17 inner side surface
19 first hole
21 third hole
23 front side surface
25 rear side surface
27 first end surface
29 second end surface
31 second hole
33 fourth hole
35 first surface
37 second surface
39 third surface
41 cutting edge
41a first cutting edge
41b second cutting edge
43 through hole
45 third screw
47 first inclined surface
47a first portion
49 second inclined surface
49a second portion
51 third inclined surface
51a third portion
53 fourth inclined surface
53a fourth portion
101 workpiece
103 machined product
Y0 rotation axis
Y1 first end
Y2 second end
Y3 rotation direction
Z1 first central axis
Z2 second central axis
Z3 third central axis
Z4 fourth central axis

The invention claimed is:
1. A cutting tool, comprising:
a holder having a columnar shape extended from a first end to a second end along a rotation axis, and comprising a pocket located on a side of the first end;
a shim member located in the pocket;
a first screw to fix the shim member to the pocket; and
an insert in contact with the shim member on a front side of a rotation direction of the rotation axis,
wherein the shim member comprises:
an outer side surface located on a side of an outer periphery of the holder,
an inner side surface located on a side opposite to the outer side surface and located closer to the rotation axis than the outer side surface,
a front side surface located on a front side in the rotation direction,
a rear side surface located on a side opposite to the front side surface, and
a first hole opening into the outer side surface and the inner side surface,
the pocket comprises a second hole corresponding to the first hole,
the first screw is inserted into the first hole and the second hole, and
a first central axis of the first hole is located ahead of a second central axis of the second hole in the rotation direction, such that the first central axis is offset from the second central axis in a circumferential direction before inserting and securing the first screw to the shim member and the pocket.

2. The cutting tool according to claim 1, wherein the first central axis is located closer to the first end than the second central axis, in a direction parallel to the rotation axis.

3. The cutting tool according to claim 1, further comprising:
a second screw to fix the shim member to the pocket, wherein
the shim member further comprises a third hole which opens into the outer side surface and the inner side surface,
the third hole is located closer to the first end than the first hole,
the pocket further comprises a fourth hole corresponding to the third hole,
the second screw is inserted into the third hole and the fourth hole, and
a third central axis of the third hole is located ahead of a fourth central axis of the fourth hole in the rotation direction, such that the third central axis is offset from the fourth central axis in a circumferential direction before inserting and securing the second screw to the shim member and the pocket.

4. The cutting tool according to claim 1, wherein the shim member comprises
a first inclined surface is located between the front side surface and the outer side surface, and
the first inclined surface is inclined away from the rear side surface as going away from the outer side surface.

5. The cutting tool according to claim 4, wherein the first inclined surface comprises a first portion whose width in a direction parallel to the first central axis becomes larger in a direction from the second end to the first end in a plan view from the front side surface.

6. The cutting tool according to claim 1, wherein the shim member comprises
a second inclined surface located between the front side surface and the inner side surface, and
the second inclined surface is inclined away from the rear side surface as going away from the inner side surface.

7. The cutting tool according to claim 6, wherein the second inclined surface comprises a second portion whose width in a direction parallel to the first central axis becomes larger in a direction from the first end to the second end in a plan view from the front side surface.

8. The cutting tool according to claim 1, wherein the shim member comprises
a first end surface located between the front side surface and the rear side surface, the first end surface located on a side of the first end, and
a third inclined surface located between the front side surface and the first end surface, and
the third inclined surface is inclined away from the rear side surface as going away from the first end surface.

9. The cutting tool according to claim 8, wherein the third inclined surface comprises a third portion whose width in a direction orthogonal to the first central axis becomes larger in a direction from the inner side surface to the outer side surface in a plan view from the front side surface.

10. The cutting tool according to claim 1, wherein the shim member comprises
a second end surface located between the front side surface and the rear side surface, the second end surface located on a side of the second end, and
a fourth inclined surface located between the front side surface and the second end surface, and
the fourth inclined surface is inclined away from the rear side surface as going away from the second end surface.

11. The cutting tool according to claim 10, wherein the fourth inclined surface comprises a fourth portion whose width in a direction orthogonal to the first central axis becomes larger in a direction from the outer side surface to the inner side surface in a plan view from the front side surface.

12. A method for manufacturing a machined product, comprising:
rotating the cutting tool according to claim 1;
bringing the cutting tool being rotated into contact with a workpiece; and
moving the cutting tool away from the workpiece.

* * * * *